| (12) | United States Patent | (10) Patent No.: | US 11,109,612 B2 |
|---|---|---|---|
| | Singer | (45) Date of Patent: | *Sep. 7, 2021 |

(54) INSTANT HOT WATER DRINKS

(71) Applicant: Nicholas J. Singer, Irvine, CA (US)

(72) Inventor: Nicholas J. Singer, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/573,454

(22) Filed: Sep. 17, 2019

(65) Prior Publication Data

US 2020/0077680 A1    Mar. 12, 2020

Related U.S. Application Data

(63) Continuation of application No. 16/380,919, filed on Apr. 10, 2019, now abandoned, which is a continuation-in-part of application No. 15/917,012, filed on Mar. 9, 2018, now abandoned, which is a continuation of application No. 15/651,136, filed on Jul. 17, 2017, now Pat. No. 9,943,091, which is a continuation of application No. 14/869,840, filed on Sep. 29, 2015, now Pat. No. 9,737,090, which is a (Continued)

(51) Int. Cl.

| A23L 2/395 | (2006.01) |
|---|---|
| A23F 5/46 | (2006.01) |
| A23F 3/40 | (2006.01) |
| A23F 3/32 | (2006.01) |
| A23L 27/00 | (2016.01) |
| A23P 20/10 | (2016.01) |
| A23F 5/38 | (2006.01) |

(52) U.S. Cl.

CPC ............... *A23L 2/395* (2013.01); *A23F 3/32* (2013.01); *A23F 3/40* (2013.01); *A23F 5/38* (2013.01); *A23F 5/46* (2013.01); *A23L 27/72* (2016.08); *A23P 20/10* (2016.08); *A23P 20/105* (2016.08); *A23P 20/11* (2016.08)

(58) Field of Classification Search

CPC ...... A23F 3/32; A23F 3/40; A23F 5/38; A23F 5/46; A23L 2/395; A23L 27/72; A23P 20/105; A23P 20/11; A23P 20/10

USPC .......... 426/590, 89, 615, 512, 515, 516, 517

See application file for complete search history.

(56) References Cited

U.S. PATENT DOCUMENTS

| 1,970,396 A | * | 8/1934 | Scherer |
|---|---|---|---|
| 3,423,489 A | | 1/1969 | Arens |

(Continued)

OTHER PUBLICATIONS

Rohrig, Brian, Paintball Chemistry Hits Its Mark, ChemMatters, Apr. 2007, pp. 4-7.

(Continued)

*Primary Examiner* — Helen F Heggestad

(74) *Attorney, Agent, or Firm* — Klein, O'Neill & Singh, LLP

(57) ABSTRACT

A product having an internal substance protected by a rugged exterior shell is disclosed. The internal substance is reactive with the exterior shell but is separated therefrom by a coating on an interior surface of the external shell so that the product can be stored for a long period of time without the internal substance reacting with the exterior shell. The coating is meltable so that, when desired, the product may be heated (e.g. immersed in hot water or exposed to heat) in order to melt the coating so that the internal substance can react with the external shell so that the internal substance can excrete out of the exterior shell.

5 Claims, 10 Drawing Sheets

Related U.S. Application Data continuation-in-part of application No. 14/609,215, filed on Jan. 29, 2015, now Pat. No. 9,167,844.

(60) Provisional application No. 62/084,443, filed on Nov. 25, 2014.

(56) References Cited

U.S. PATENT DOCUMENTS

| | | |
|---|---|---|
| 6,290,988 B1 * | 9/2001 | Vilsteren et al. |
| 7,900,620 B1 * | 3/2011 | Walters et al. |
| 9,167,844 B1 | 10/2015 | Singer |
| 9,737,090 B2 | 8/2017 | Singer |
| 9,943,091 B2 | 4/2018 | Singer |
| 2001/0021404 A1 * | 9/2001 | Uhlemann et al. |
| 2003/0017246 A1 * | 1/2003 | Alamian et al. |
| 2004/0170725 A1 | 9/2004 | Begleiter |
| 2006/0039958 A1 | 2/2006 | Fuisz |
| 2007/0053956 A1 * | 3/2007 | Tandler et al. |
| 2011/0037021 A1 | 2/2011 | Tschernjaew |
| 2012/0156288 A1 | 6/2012 | Lakkis |
| 2016/0143338 A1 | 5/2016 | Singer |

OTHER PUBLICATIONS

Non-Final Office Action of co-pending U.S. Appl. No. 16/380,919 dated Jun. 20, 2019.

\* cited by examiner

INSTANT HOT WATER DRINKS

CROSS-REFERENCE TO RELATED APPLICATIONS

The present application is a continuation of U.S. patent application Ser. No. 16/380,919, filed on Apr. 10, 2019, which is a continuation in part application of U.S. patent application Ser. No. 15/917,012, filed on Mar. 9, 2018, which is a continuation of U.S. patent application Ser. No. 15/651,136 filed on Jul. 17, 2017, which is a continuation of U.S. patent application Ser. No. 14/869,840 filed on Sep. 29, 2015, which is a continuation in part of U.S. patent application Ser. No. 14/609,215, filed Jan. 29, 2015, which claims the benefit of Provisional Patent Application Ser. No. 62/084,443, filed on Nov. 25, 2014, the entire contents of which are expressly incorporated herein by reference.

STATEMENT RE: FEDERALLY SPONSORED RESEARCH/DEVELOPMENT

Not Applicable

BACKGROUND

The various aspects and embodiments described herein relate to instant hot water drinks.

Current concentrates are currently marketed in large containers that the end user must measure and dissolve in liquid or in prepackaged quantities that must be broken open and dropped into water. Unfortunately, there are certain deficiencies in the art regarding these concentrates.

Accordingly, there is a need in the art for an improved method and device for delivering edible concentrates.

BRIEF SUMMARY

A capsule containing a concentrate that can be dissolved in hot water within about 10 seconds to about 30 seconds and a machine for fabricating the capsule is shown. The capsule may have a rugged food grade exterior shell fabricated from a gelatin material. This exterior shell protects a concentrate contained in the exterior shell during handling, storage and other deleterious effects from outside forces. A food grade paraffin may be coated on an interior surface of the exterior shell to protect the exterior shell from interaction with the concentrate disposed within the center of the capsule. The concentrate may be a water-based liquid or solid disposed within the food grade exterior shell and separated from that food grade exterior shell by coating the interior surface thereof with the food grade paraffin. During storage and handling, the food grade exterior shell is sufficiently rugged to allow for dropage, pressure, etc. without breaking the exterior shell and spilling the water-based liquid or solid concentrate. In order to mix the concentrate with water, the capsule is submerged in hot water which eventually melts the paraffin coating to allow the water-based concentrate to interact with the exterior shell to dissolve the exterior shell and release the concentrate.

More particularly, a capsule dissolvable in hot water is disclosed. The capsule may comprise a food grade exterior shell, a food grade paraffin coating and a water based liquid or solid. The food grade exterior shell may be fabricated from a gelatin material. The food grade paraffin coating may be disposed on an interior surface of the food grade exterior shell. The food grade paraffin may have a melting temperature at least about 130° F. The water based liquid or solid may be disposed within the food grade exterior shell and separated from the food grade exterior shell by the food grade paraffin coating. To release the water based liquid or solid, the capsule may be disposed within hot water having a temperature of at least about 130° F. By doing so, the food grade exterior shell is dissolved and the paraffin coating melts so that the water based solid or liquid interacts with the exterior shell to dissolve the exterior shell to release the water based liquid or solid into the water.

The food grade paraffin may have a melting temperature at least between 130° F. to 200° F.

The water based liquid or solid may mix homogenously with the water.

A thickness of a wall of the food grade exterior shell may be between about 0.2 mm and about 3 mm. A thickness of the food grade paraffin coating may be between about 0.05 mm and about 2 mm.

The food grade paraffin coating may be oil based.

The food grade exterior shell may be sufficiently rugged for transportation of the capsule over trucks, trains and planes.

The water based liquid or solid may be coffee extract, tea extract, food flavoring or combinations thereof.

In another aspect, a method of producing a capsule which is dissolvable in hot water is disclosed. The method may comprise the steps of forming first and second ribbons of a gelatin material, each of the first and second ribbons defining an interior surface and an exterior surface; coating the interior surfaces of the first and second ribbons with a food grade paraffin; guiding the first and second ribbons between first and second rollers; disposing a water based liquid or solid between the first and second ribbons; and molding a plurality of capsules with the first and second rollers to encapsulate the water based liquid or solid within the capsules.

The coating step may comprise the step of spraying the food grade paraffin in liquid form on the interior surfaces of the first and second ribbons. The forming step may comprise the step of forming the first and second ribbons to be between about 0.2 mm and about 3 mm. The disposing step may includes the step of injecting a material having a viscosity between about 5,000 cP and about 10,000 cP.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
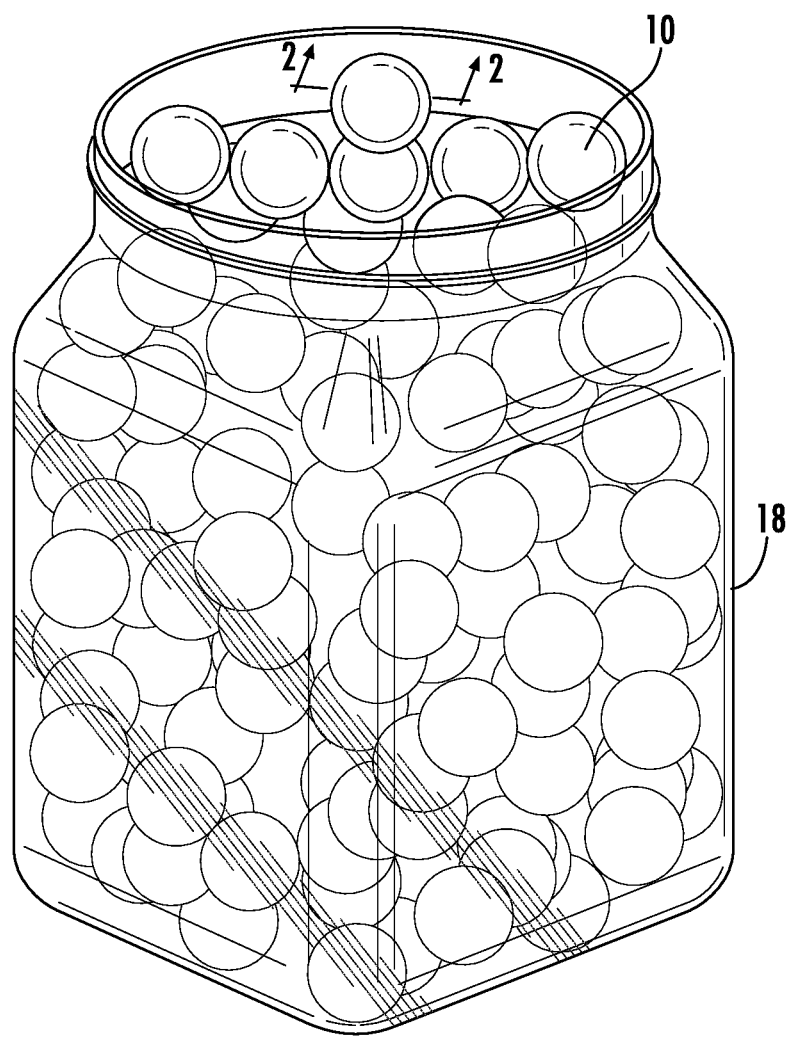
FIG. 1 is a perspective view of a plurality of capsules disposed within the container.
Figure 2:
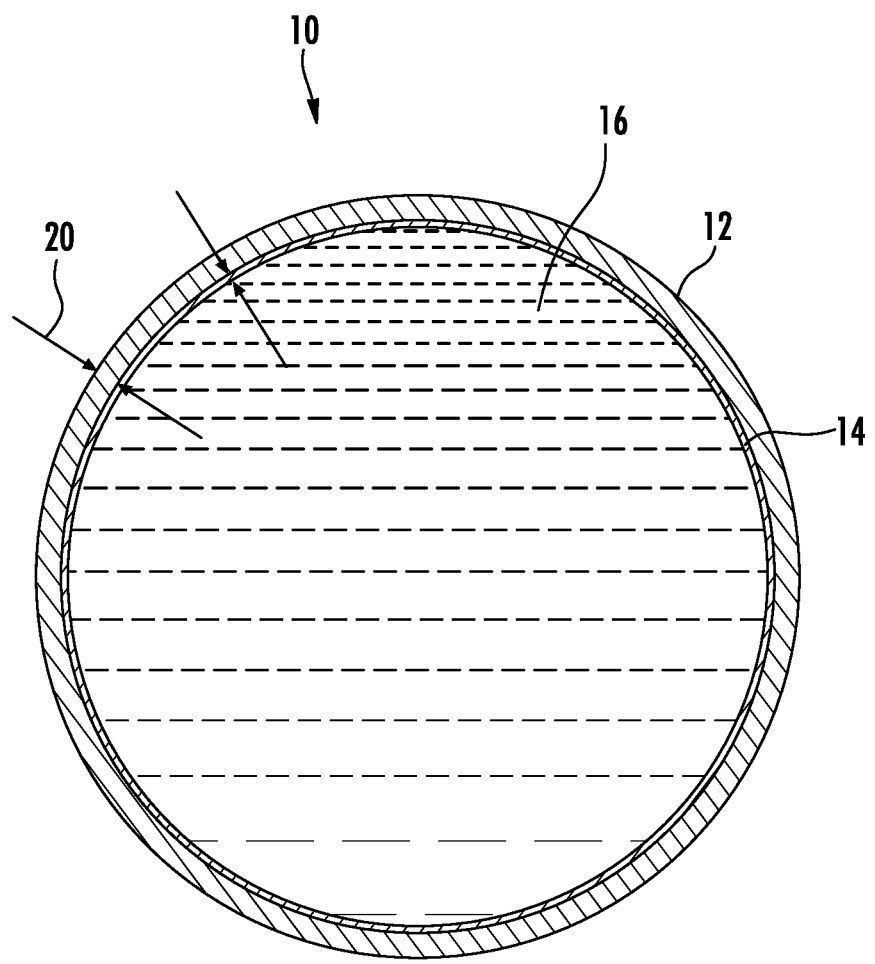
FIG. 2 is a cross-sectional view of one of the capsules shown in FIG. 1.

Referring now to the drawings, a capsule 10 is shown. More broadly, the capsule may be referred to as a casing. The capsule does not dissolve even when exposed to humid conditions. As such, the capsule 10 retains its shape and integrity during storage over a long period of time and transportation. The capsule 10 has an exterior shell 12 that is sufficiently rugged to handle normal handling during transportation and storage without cracking or breaking. It also does not degrade due to moisture in the air. An interior surface of the exterior shell 12 may be coated with a paraffin 14 and provides a layer of separation between the exterior shell 12 and a concentrate 16 disposed within the capsule 10 so that the concentrate 16 does not degrade the exterior shell 12. In this regard, the exterior shell 12 may be fabricated from a water dissolvable material and the concentrate 16 may be a water-based material. Due to the paraffin coating 14, the water in the concentrate 16 does not dissolve or degrade the exterior shell 12. To release the concentrate 16, the capsule 10 may be placed in hot water wherein the hot water is at a temperature sufficient to melt the paraffin 14. By melting the paraffin 14, the concentrate 16 then interacts with the exterior shell 12 which in our example would dissolve the exterior shell 12 so that the concentrate 16 excretes out of the exterior shell 12. The exterior shell 12 may be semi rigid or have the flexibility of a plastic film or sheet of paper.

Referring now to FIG. 1, a plurality of capsules 10 is shown as being contained within a container 18. The capsule 10 has an exterior shell 12 that is capable of withstanding normal forces due to transportation over truck, train and plane and also the weight of other capsules 10 so that the concentrate 16 does not leak out of the capsule 10 during storage and handling. The exterior shell 12 may be rugged or flexible having the flexibility of a plastic film or sheet of paper with a thickness of about 0.003 inches thick. The exterior shell 12 may be fabricated from a food grade gelatin material. By way of example and not limitation, the food grade gelatin material may be amylose, pullulan, guar gum, callaneenan, cellulose or combinations thereof. The exterior shell 12 may have a spherical configuration and be approximately 0.2 mm thick 20. The exterior shell may have other configurations such as rectangular pouch or tubular.

The food grade gelatin material may be dissolvable in water. Preferably, the food grade gelatin material dissolves relatively slowly in cold water but quickly in hot water. By way of example and not limitation, the amount of food grade gelatin material and thickness of the exterior shell 12 may be adjusted such that the exterior shell 12 dissolves within about 10 to about 30 seconds when submerged in hot water at a temperature above 130° F.

Although the capsule 10 has been described as having a food grade exterior shell 12 fabricated from a gelatin material, other types of materials are also contemplated including but not limited to thermoplastic starch, polyvinyl alcohol, aliphatic copolyester, aliphatic/aromatic copolyester, polyactic acid, and blends of these polymers, and also polyethelene, polyethylene terephthalate and polyvinyl chloride. These other materials may be food grade or non-food grade materials.

An interior surface of the exterior shell 12 may be coated with paraffin 14. The paraffin 14 acts as a barrier between the exterior shell 12 and the concentrate 16 located within the capsule 10. The paraffin 14 is inert and does not react with the concentrate 16 or the exterior shell 12 so that the concentrate 16 can be preserved over a long period of time. The paraffin 14 may be a food grade paraffin 14 and may be coated on the interior surface of the exterior shell 12. In order to release the concentrate 16, the capsule 10 may be heated to a temperature above the melting temperature of the paraffin 14. By way of example and not limitation, paraffin 14 may have a melting temperature of about 130° F. As such, in order to release the concentrate 16, the capsule 10 may be placed within hot water or otherwise heated which would dissolve the exterior shell 12 from the outside. Also, the paraffin 14 would melt in order to allow the concentrate 16 to interact with the exterior shell 12 to dissolve the exterior shell 12 from the outside. The concentrate 16 is released and quickly dissolved in the hot water within about 10 seconds to about 30 seconds.

The paraffin 14 may be sprayed on the interior surface of the exterior shell 12 during manufacture of the capsule 10. The paraffin 14 may have a thickness 22 of about 0.2 mm. Although the paraffin 14 is preferably sprayed on the interior surface of the exterior shell 12, the paraffin 14 may also be melted and spread over the interior surface of the exterior shell 12. The thickness 22 of the paraffin 14 may be adjusted (e.g., increased) in order to ensure that even minor degradation in the paraffin 14 will not cause the concentrate 16 to be placed in contact with the exterior shell 12.

The paraffin 14 is described as having a melting temperature of about 130° F. However, other materials having higher or lower melting temperatures are also contemplated. These other materials may also be food grade so that they can be consumed by a person.

The paraffin 14 or the inner protective layer may be substituted with other types of materials including but not limited to polyvinyl alcohol. The substitute material for the paraffin 14 may be useful for minimizing or mitigating any detrimental interactions between the contents disposed within the capsule 10 or exterior layer and food grade exterior shell or layer.

The concentrate 16 may be a water-based liquid or a solid. When the paraffin 14 is melted away, the water content within the water-based liquid or solid reacts with the exterior shell 12 to dissolve the same from the inside-out. In this manner, the interaction speeds up the disintegration of the capsule 10 when heated such as by placing the capsule 10 in hot water. The concentrate 16 may be dissolvable in water so that when the exterior shell 12 dissolves in water and the paraffin 14 melts away, the concentrate 16 may mix with the water. By way of example and not limitation, the concentrate 16 may dissolve in water in order to provide for a homogeneous solution or may be dispersed within the water in order to provide for a heterogeneous solution. Moreover, the concentrate 16 may be partially dissolvable in water to provide for a mixed homogeneous and heterogeneous solution/mixture.

The food product 16 within the capsule 10 may be a coffee extract, tea extract, food flavoring, protein powder, nutritional supplement, dissolvable coffee or combinations thereof.

Figure 3:
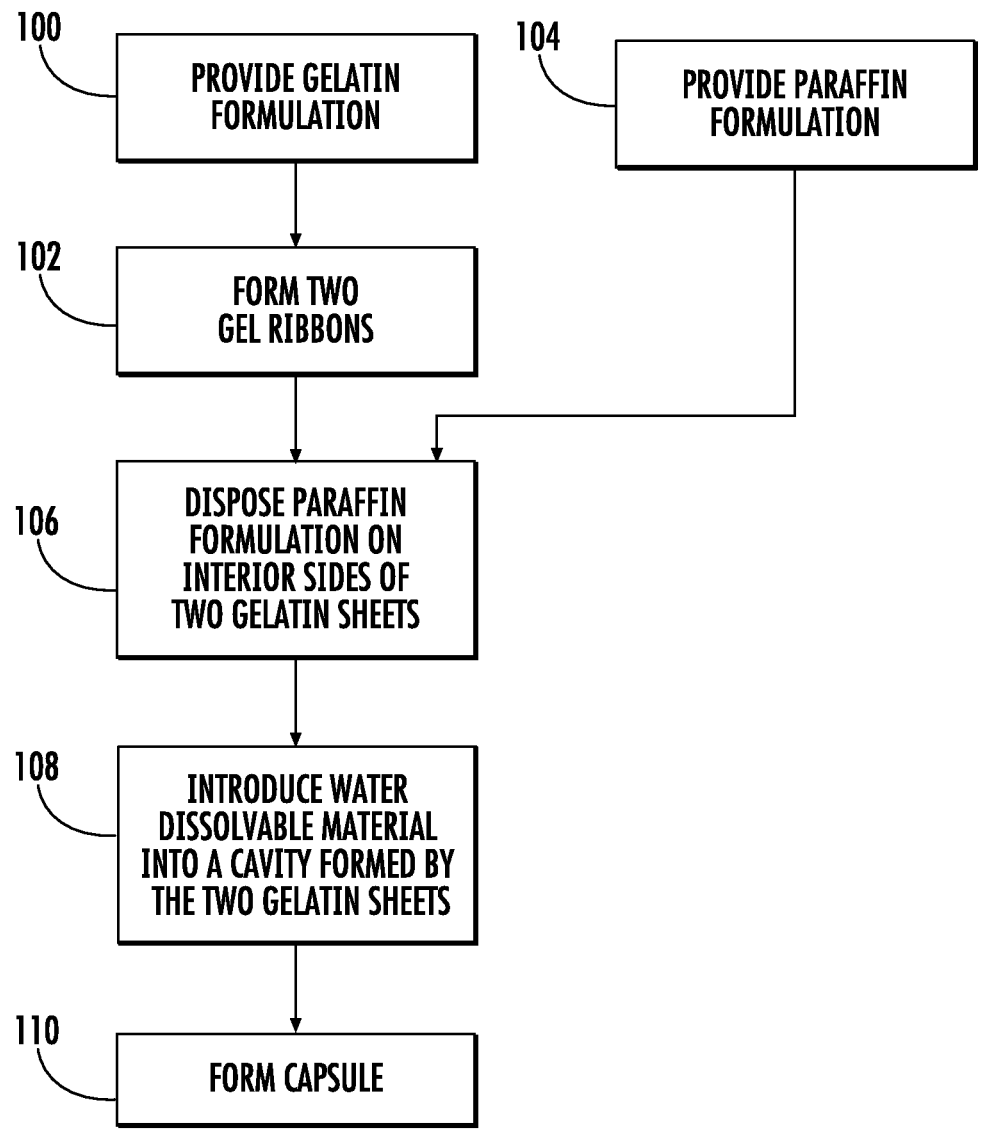
FIG. 3 is a flowchart for forming the capsule.
Figure 4:
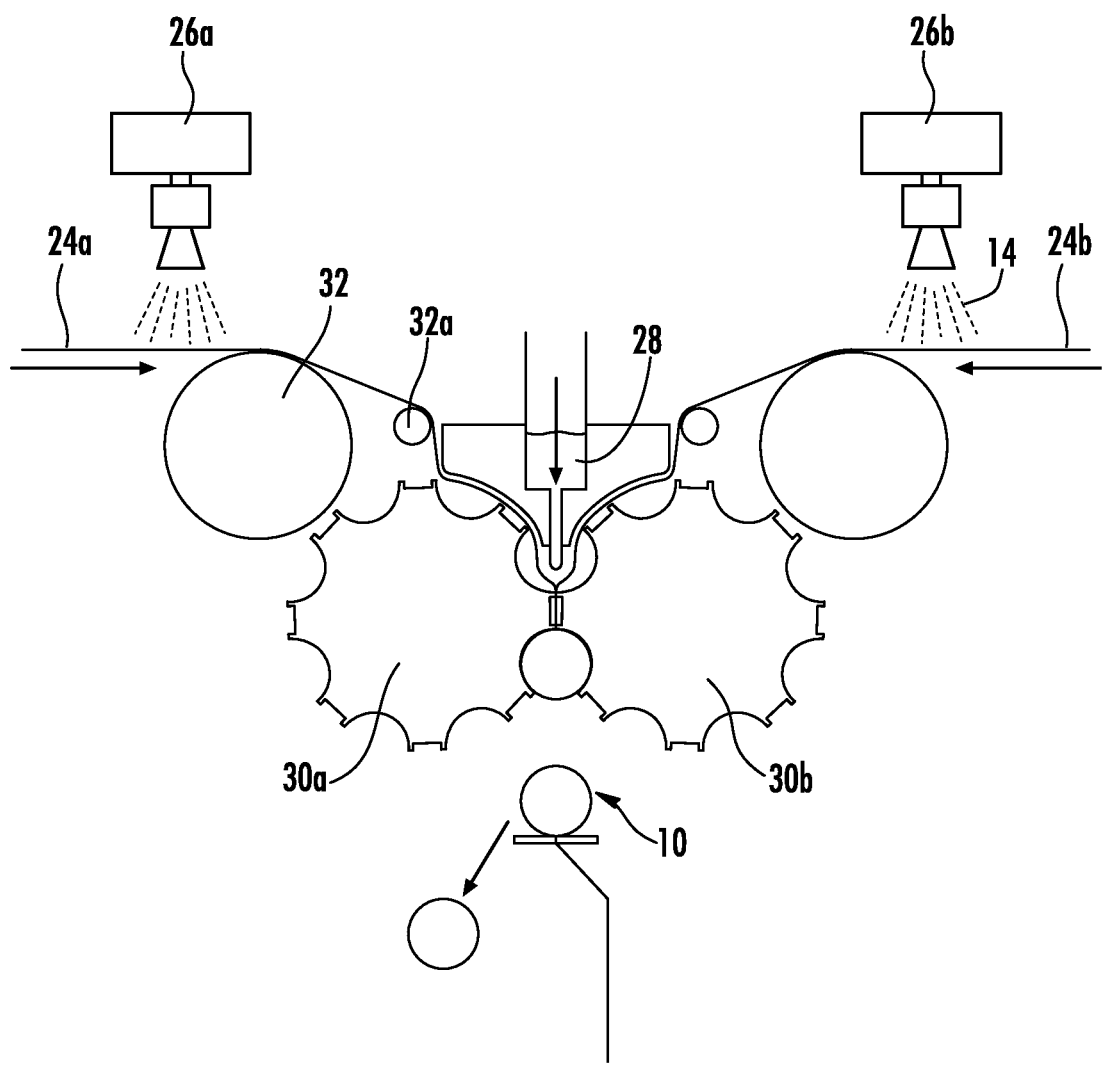
FIG. 4 is a front elevational view of a machine for forming the capsule.

Referring now to FIG. 3, a process for manufacturing the capsule 10 is shown. The process may begin with providing 100 a gelatin formulation. The gelatin is melted and formed 102 into two ribbons 24a, b. As shown in FIG. 4, two ribbons 24a, b are shown which each form one half of the exterior shell 12 of the capsule 10. Simultaneously, a paraffin formulation is provided 104 and is melted so that the melted paraffin 14 can be disposed 106 (e.g., sprayed or spread) on a surface of the ribbon 24a, b that defines the interior surface of the exterior shell 12. Sprayers 26a, b may be placed above the ribbons 24a, b in order to spray the melted paraffin 14 on the ribbon 24a, b. A water dissolvable material (e.g., concentrate 16) may be introduced 108 into a cavity formed by the ribbons 24a, b within injector 28. First and second rotary clamshells 30a, b form 110 the capsule 10 into a spherical shape, as shown in FIG. 4.

Figure 5:
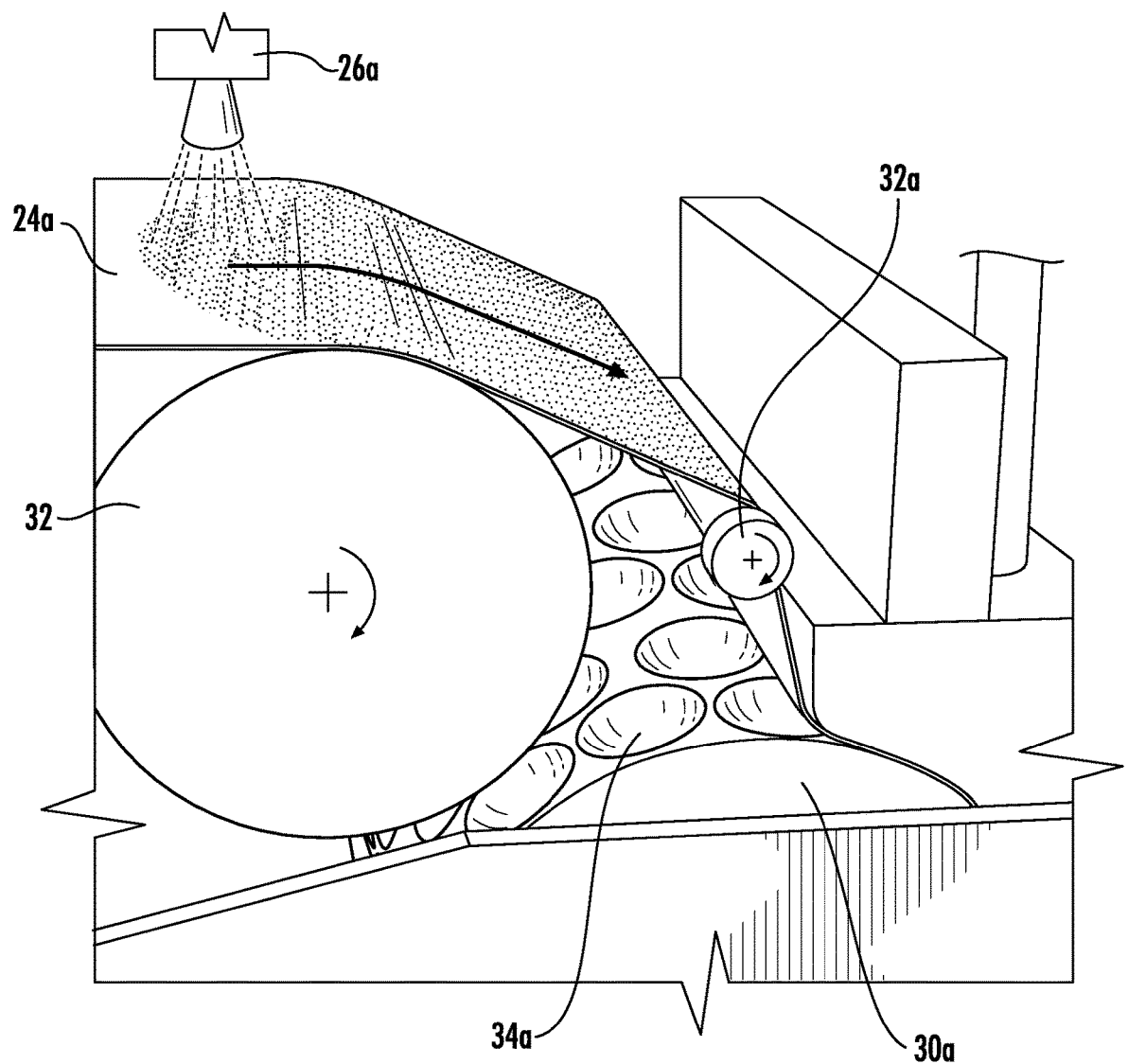
FIG. 5 is an enlarged top perspective view of a portion of the machine shown in FIG. 4.
Figure 6:
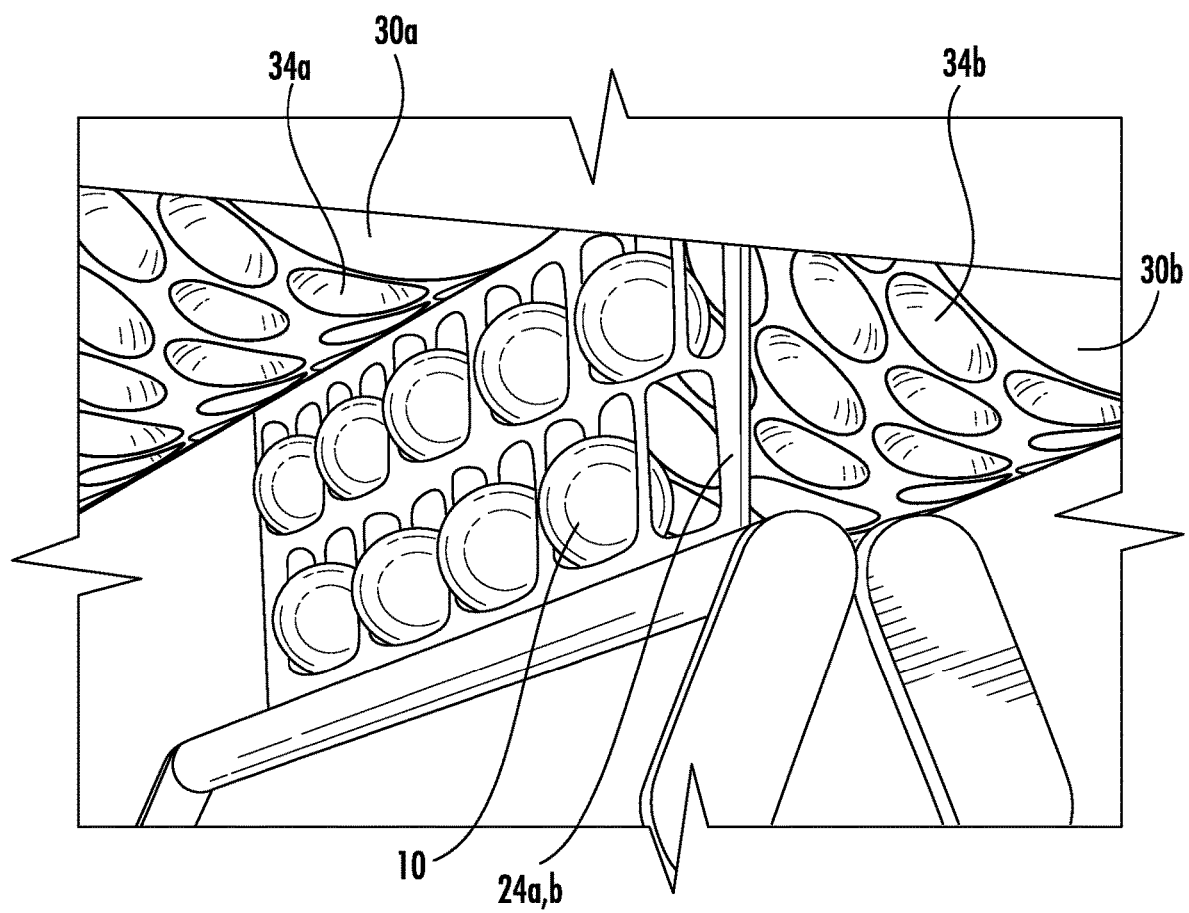
FIG. 6 is an enlarged bottom perspective view of a portion of the machine shown in FIG. 4.

Referring now to FIG. 5, a partially enlarged view of the machine shown in FIG. 4 is shown. The ribbon 24a is guided on a series of rollers 32, 32a to a position between the clamshells 30a, b. The sprayer 26a is located above the ribbon 24a and positioned so that the melted paraffin covers the entire width of the ribbon 24a. The ribbon 24 may travel at a slow speed so that the melted paraffin 14 dries up or is semi-malleable before the concentrate 16 is injected with the injector 28 and the concentrate 16 is formed. The rollers 32a, b may have a plurality of semi-spherical cavities 34 to contour the ribbon 24a, b into the spherical shape configuration. The clamshells 30a, b may have a plurality of semi-spherical cavities 34 that mate with each other to form the spherical configuration of the capsule 10. As the clamshells 30a, b rotate, corresponding semi-spherical cavities 34a, b mate up with each other and form the spherical configuration of the capsule 10. The clamshells 30a, b may be heated so that the ribbons 24a, b may be formed and cut. The injector 28 pressurizes the interior of the cavity formed by the ribbons 24a, b in order to push the ribbons 24a, b into conformity with the configuration of the semi-spherical cavity 34.

Thereafter, the capsule 10 is attached to the joined ribbon 24a, b and eventually falls to the sides and is then collected in the container 18.

Although the capsule 10, and more particularly, an outer surface of the exterior shell 12 was described as having a spherical configuration, other configurations are also contemplated such as cube, pyramidal, etc. The cavities 34a, b would form one half of the alternate configuration.

In another embodiment, the exterior shell 12 may be fabricated from a material that is non-dissolvable in water. However, the material of the exterior shell 12 may be reactive with a substance 16. The interior surface of the exterior shell 12 may be coated with a coating 14 that is non-reactive with the substance 16 but may be melted at a temperature. The interior of the exterior shell 12 and the coating 14 may hold the substance 16 or a derivative thereof. When the product is immersed in water, the exterior shell 12 does not disintegrate to expose the substance 16 within the product. However, when the product is heated by disposing the product in hot water or applying heat to the product, the coating 14 melts away so that the substance 16 interacts with interior surface of the exterior shell 12. Such interaction disintegrates or dissolves the exterior shell 12 so that the substance 16 leaks out of the exterior shell 12.

Figure 7:
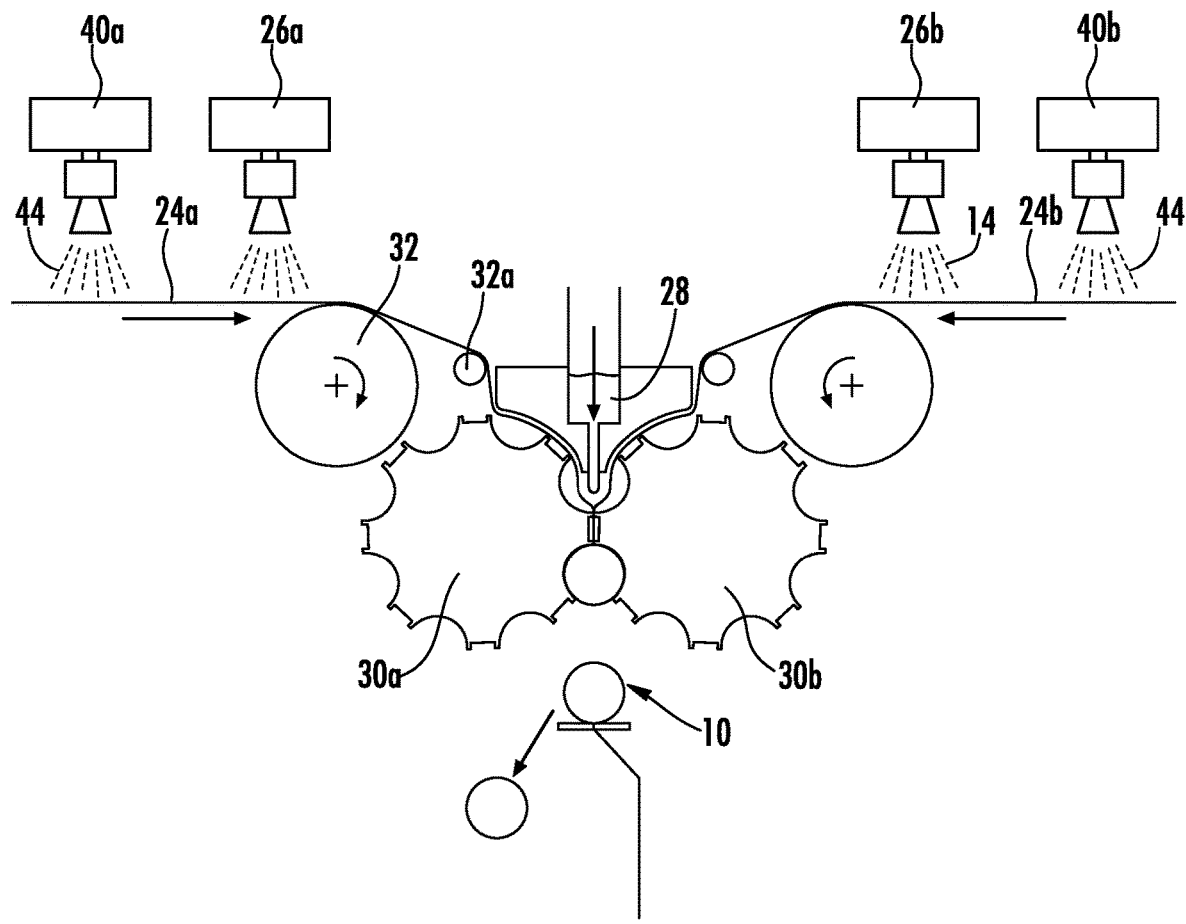
FIG. 7 illustrates the process shown in FIG. 4 with an additional sprayer for spraying on additives.

Referring now to FIG. 7, the process for manufacturing the capsule 10 shown in FIG. 3 may also have an additional sprayer 40a, 40b. The sprayers 40a, b may spray an additive. By way of example and not limitation, such additives may be a preservative, vitamin fortification, flavor enhancement or combinations thereof. Once the additive is sprayed onto the surface of the ribbon 24a, b, the paraffin 14 locks the additive between the paraffin 14 and the ribbon 24a, b so that the concentrate 16 does not interact with the additive.

Figure 8:
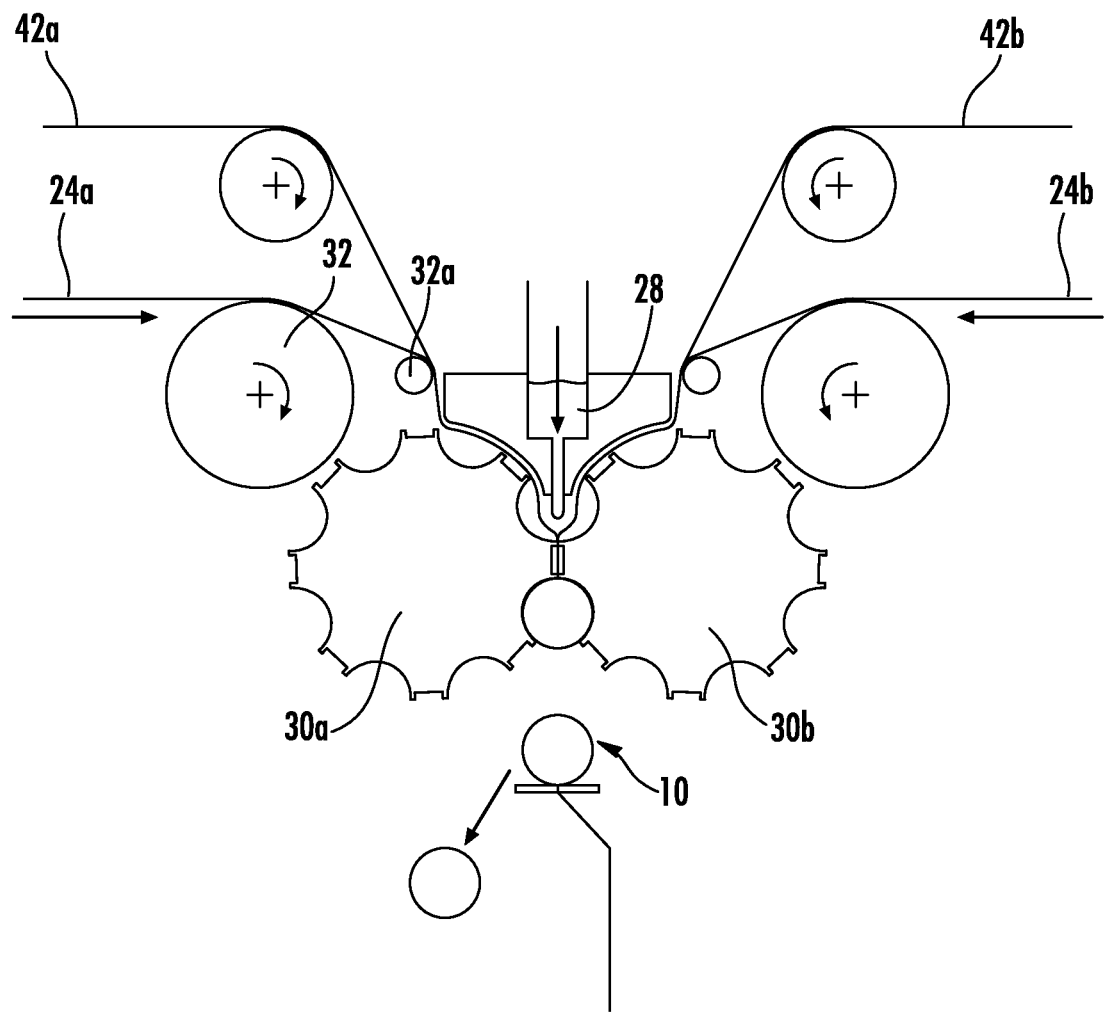
FIG. 8 is an alternate embodiment of the process shown in FIG. 4.
Figure 9:
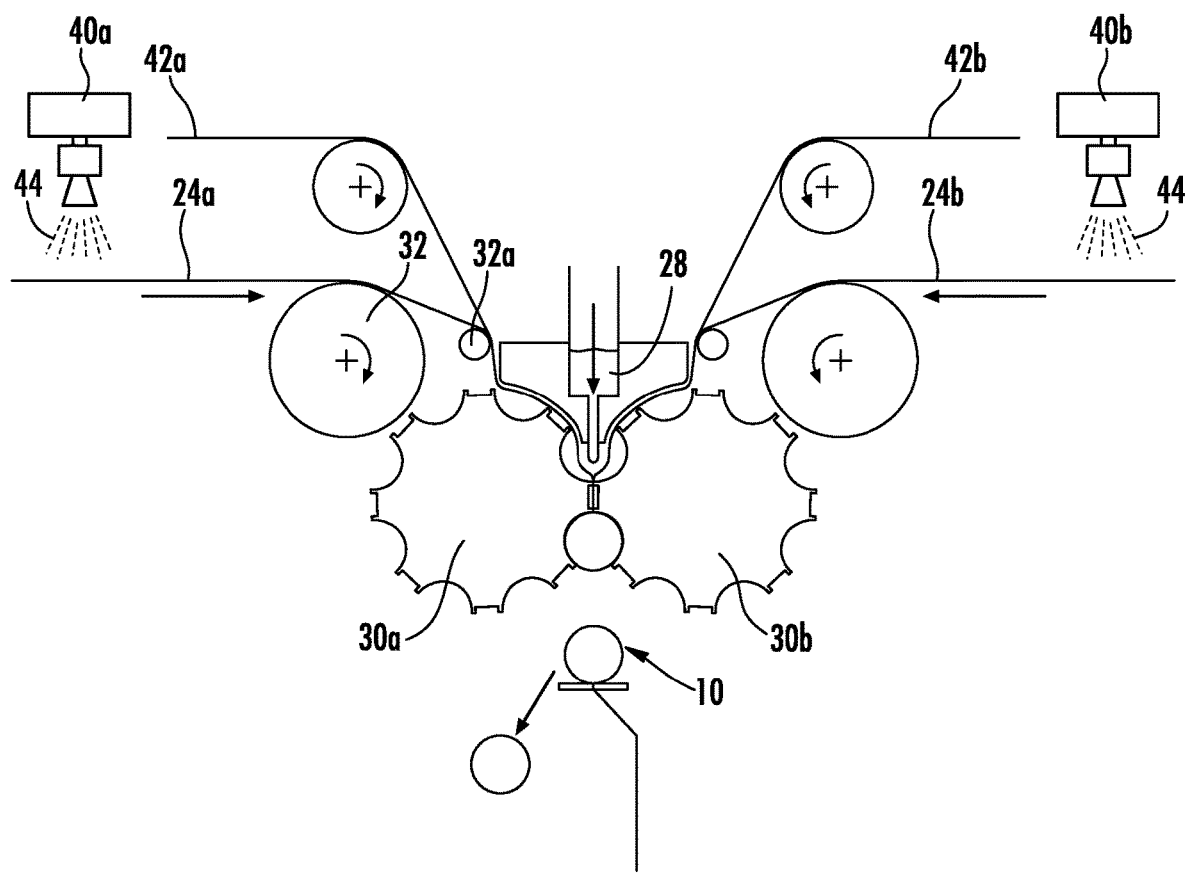
FIG. 9 illustrates the process shown in FIG. 8 with the addition of sprayers for spraying on additives.

Referring now to FIG. 8, in lieu of the sprayers 26a, b for spraying paraffin 14 on the ribbons 24a, b, it is also contemplated that a paraffin ribbon 42a, b may be formed and fed between the rotary clamshells 30a, b which attaches (e.g., fuses) the ribbon 24a to ribbon 42a and ribbon 24b to ribbon 42b. Referring now to FIG. 9, sprayers 40a, b may spray additives on the ribbons 24a, b. The additive 44 may be locked between ribbons 24a, b and 42a, b.

The concentrate 16 discussed herein may be a coffee extract, tea extract, food flavoring or combinations thereof. The concentrate 16 may be a coffee extract so that upon dissolution into hot water, one capsule dissolved in 8 fluid ounces of hot water will form regular strength hot coffee. Different concentrations of the concentrate 16 are also contemplated in that the concentrate 16 may have a potency so that one or more capsules mixed in a certain number of fluid ounces would form regular strength hot coffee. By way of example, three (3) capsules dissolved in 8 fluid ounces of hot water may form regular strength hot coffee. By inserting more or less concentrate in hot water, the strength of the hot coffee may be regulated. More concentrate will produce stronger coffee. Less concentrate will produce weaker coffee. Although the various aspects and embodiments were discussed in relation to the concentrate, it is also contemplated that the concentrate 16 may be non-concentrated or normal concentration for the purposes of mixing a substance in hot water.

The capsules 10 may also be dipped in a flavored liquid that solidifies when removed from the flavored liquid. The flavored liquid may be a chocolate coating or other liquefied food product. The flavored liquid may also solidify and adhere to the exterior of the capsule 10 when the flavored liquid is dried out when the capsule 10 is removed from the flavored liquid or when the dipped capsule 10 with the flavored liquid coated on the outside of the capsule 10 is heated.

Figure 10:
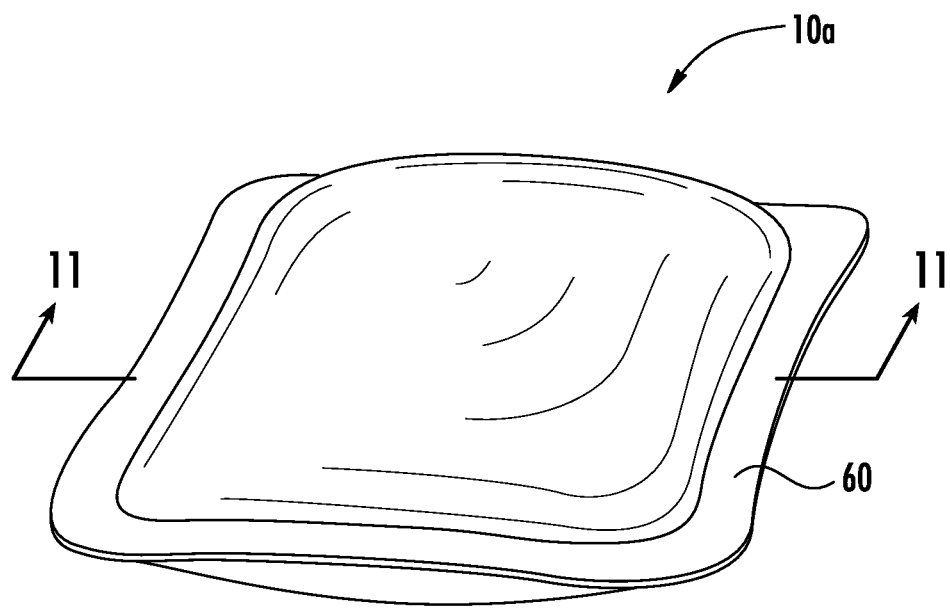
FIG. 10 is a perspective view of a second embodiment of the capsule.
Figure 11:
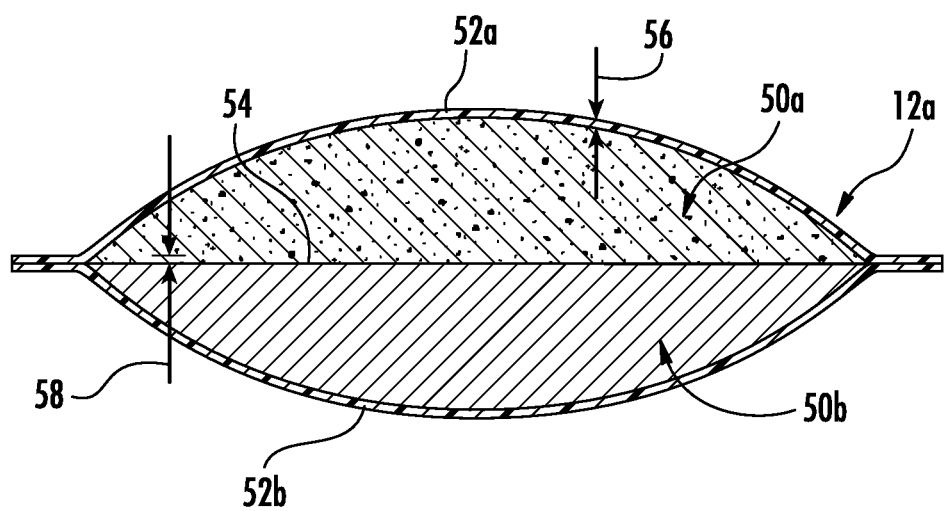
FIG. 11 is a cross-sectional view of the second embodiment of the capsule shown in FIG. 10.

Referring now the FIGS. 10 and 11, a second embodiment of the capsule 10a is shown. The capsule 10a is shown as having two compartments 50a, b. However, it is also contemplated that the capsule 10a may have additional compartments 50c-n. These additional compartments 50 may be stacked upon or laid adjacent to each other as shown in FIG. 11.

The capsule 10a may have three dissolvable layers 52a, b and 54 to form two compartments 50a, b. The layers 52a, b, 54 may be fabricated from a cellulose-based material that can fully dissolve in water in under 1 minute. By way of example and not limitation, the layers 52a, b 54 may be fabricated from amylose, pullulan, guar gum, callaneenan, cellulose or combinations thereof. For example, the cellulose based layer 52a, b, 54 may comprise a combination of decaglycerin monitor myristate (CAS No. 74504-63-5 and 87390-32-7), glycerin (CAS No. 56-81-5), crystalline cellulose (9004-34-6), and hydroxypropylcellulose (CAS No. 9004-64-2). The layers 52a, b form the exterior shell 12a of the capsule 10a. In this regard, the layers 52a, b are preferably fabricated to be rugged in order to withstand normal handling during transportation, usage and storage. By way of example and not limitation, layers 52a, b may be fabricated to have a thickness 56 which is greater than the thickness 58 of the inner layer 54. The thickness 56 of the exterior layers 52a, b may be sufficient to prevent the layers 52a, b from ripping, separating or otherwise allowing the contents within the compartments 50a, b from leaking out of the capsule 10a during handling, transportation and storage.

The compartments 50a, b may contain different food products. By way of example and not limitation, the food product disposed within compartments 50*a, b* may be a powdery substance consumable by a person or animal. The food product may be mixed in water when the capsule 10*a* is disposed in water. The water may be at a temperature of approximately 68° F., or more broadly, between 60° F. and 90° F. When the capsule 10*a* is disposed in water, the water dissolves the layers 52*a, b* in order to allow the food products disposed in the compartments 50*a, b* to be mixed with the water.

The food product disposed within the compartment 50*a* may be a coffee concentrate, strawberry concentrate, etc. The food product disposed within the adjacent compartment 50*b* may be complementary to the food product disposed within the compartment 50*a*. By way of example and not limitation, the food product disposed within the adjacent compartment 50*b* may be a powdered creamer to be paired with the coffee concentrate or granulated sugar to be paired with the strawberry concentrate. The food products within the compartments 50*a, b* may complement one another so that when the capsule 10*a* is disposed in water, the food products in the compartments 50*a, b* are eventually mixed with each other to enhance the taste of the drink.

Preferably, the food products disposed in compartments 50*a, b* are not a water-based liquid. Rather, the food product disposed in the compartments 50*a, b* are a solid object such as a powdery substance. However, it is also contemplated that the inner surfaces of the layers 52*a, b* as well as the opposed surfaces of the layer 54 may be coated with a paraffin wax. In doing so, water-based liquids may then be disposed within the compartments 50*a, b* since the paraffin wax layer separates the liquid from the layers 52*a, b* and 54. The paraffin wax layer also helps to strengthen the layers 52*a, b* so that the layers 52*a, b* do not rip or tear during normal transportation, storage or use.

Additionally, the entire capsule 10*a* can be dipped within a liquid which coats the exterior of the shell 12*a* and is subsequently hardened in order to form an additional liquid layer that encapsulates the entire capsule 10*a*. This additional outer coating also helps to strengthen the layers 52*a, b* so that the layers 52*a, b* do not tear or rip during normal transportation, storage or use.

In order to fabricate capsule 10*a*, food products are disposed between the layers 52*a, b* and layer 54. Once the food product is disposed between the layers 52*a, b*, 54, the outer peripheral portion 60 is crimped together with pressure and heat by way of heat sealing so that the outer peripheral portion 60 forms an airtight seal and the food products cannot leak out of the capsule 10*a*.

The above description is given by way of example, and not limitation. Given the above disclosure, one skilled in the art could devise variations that are within the scope and spirit of the invention disclosed herein, including various ways of forming the capsules. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of producing casing which is dissolvable in water, the method comprising the steps of:

forming first and second ribbons of a material for forming a food grade exterior layer, each of the first and second ribbons defining an interior surface and an exterior surface;

forming a food grade inner protective layer on the interior surfaces of the first and second ribbons;

guiding the first and second ribbons between first and second rollers;

after forming the food grade inner protective layer on the interior surfaces of the first and second ribbons, disposing a consumable substance between the first and second ribbons, the consumable substance being separated from the first and second ribbons with the food grade inner protective layer;

forming a plurality of casings with the first and second rollers to encapsulate the consumable substance within the casing.

2. The method of claim 1 wherein the consumable substance is a solid.

3. The method of claim 1 wherein the step of forming the food grade inner protective layer is accomplished by spraying a food grade paraffin in liquid form on the interior surfaces of the first and second ribbons.

4. The method of claim 1 wherein step of forming the first and second ribbons comprises the step of forming the first and second ribbons to be between about 0.2 mm and about 3 mm.

5. The method of claim 1 wherein the step of disposing the consumable substance includes the step of injecting a material having a viscosity between about 5,000 cP and about 10,000 cP.

* * * * *